United States Patent

Bailey et al.

Patent Number: 5,803,488
Date of Patent: Sep. 8, 1998

[54] INFLATOR RETAINER AND AIR BAG MODULE

[75] Inventors: Brian J. Bailey; Patrick J. Fonk, both of Sterling Heights; Michael R. Dillon, Holly; Albert Nawrot, Clinton Township, Macomb County, all of Mich.

[73] Assignee: AlliedSignal Inc., Morristown, N.J.

[21] Appl. No.: 874,606

[22] Filed: Jun. 13, 1997

[51] Int. Cl.⁶ .................................................. B60R 21/26
[52] U.S. Cl. ....................................... 280/728.2; 280/732
[58] Field of Search ............................. 280/728.2, 732, 280/736, 740

[56] References Cited

U.S. PATENT DOCUMENTS

| | | | |
|---|---|---|---|
| 5,558,362 | 9/1996 | Acker et al. | 280/728.2 |
| 5,676,390 | 10/1997 | Olson | 280/728.2 |
| 5,687,988 | 11/1997 | Storey et al. | 280/728.2 |
| 5,704,634 | 1/1998 | Walluer et al. | 280/728.2 |

*Primary Examiner*—Christopher P. Ellis
*Attorney, Agent, or Firm*—Markell Seitzman

[57] ABSTRACT

A retainer assembly (22) for supporting an air bag inflator (24), the retainer assembly comprising: a hollow body (40), through which the inflator (24) is inserted, having a first end (28) and a second end (32), the second end including a first member for securing a cooperating second end of the inflator (36), the first end cooperating with a corresponding first end of inflator to provide a friction fit between the two components which acts to reroute gas through the retainer vent notch (46). The retainer (22), along one side thereof includes a set of access openings (48a) and (48b) and along an opposite side thereof a set of mounting holes (50a) and (50b), a respective one of the access openings aligned to a corresponding mounting hole, a set of fasteners (52) mounted to the retainer (22) through corresponding mounting holes (50a) and (50b), the access openings (48a) and (48b) providing access to a portion of the fastener to permit the fastener (52) to be secured to the retainer (22) at the corresponding mounting holes (50a) and (50b).

5 Claims, 3 Drawing Sheets

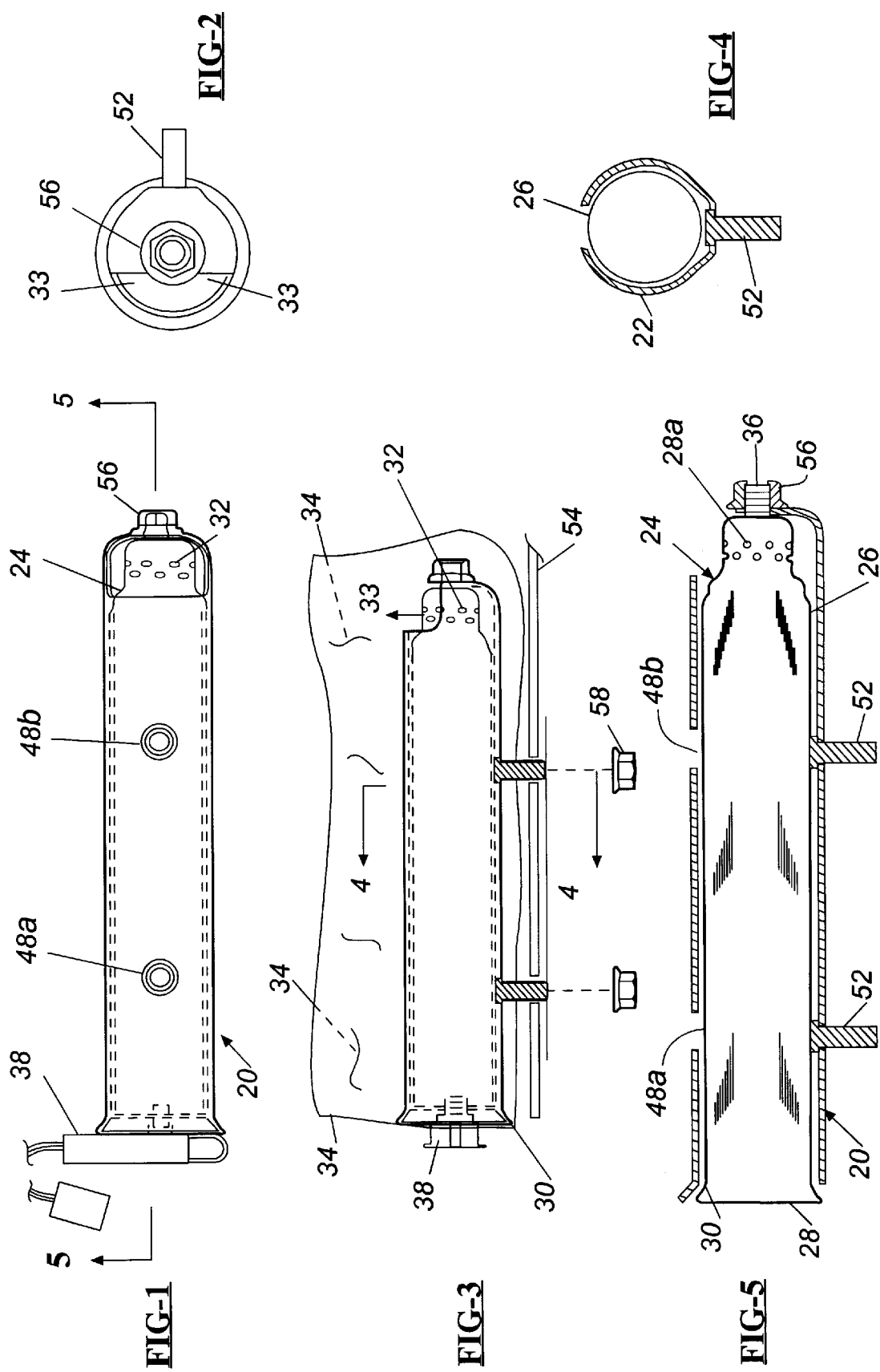

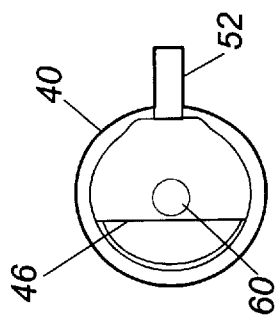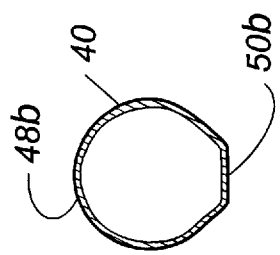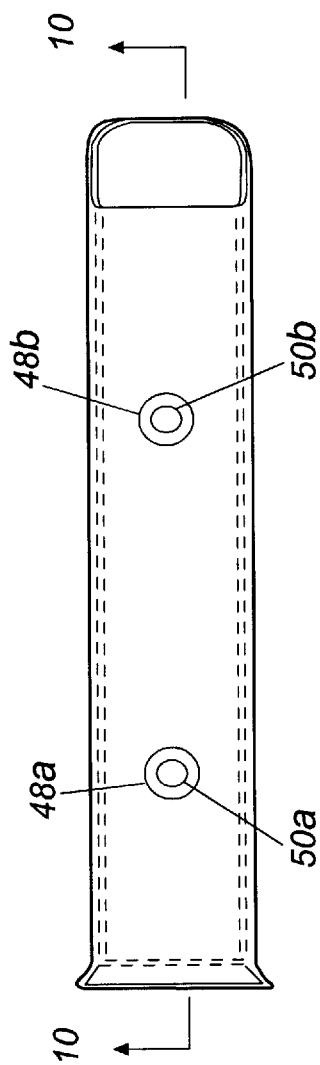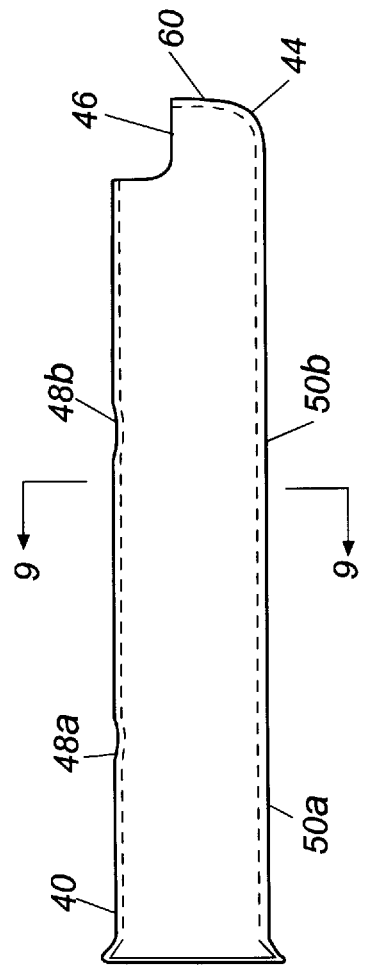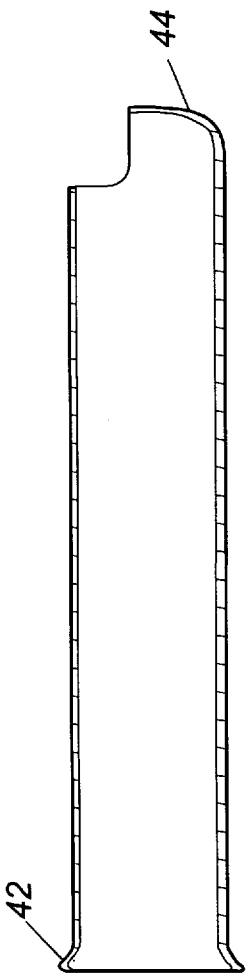

INFLATOR RETAINER AND AIR BAG MODULE

BACKGROUND AND SUMMARY OF THE INVENTION

The present invention generally relates to air bag safety restraint systems and more particularly to an improved retainer for supporting a cooperating air bag and air bag inflator.

One purpose of the present side air bag inflator retainer is to secure an inflation device such as an air bag inflator therein and provide a simple means for securing a cooperating air bag (cushion) together to form an air bag module. The inflator retainer also provides a directional venting notch to disperse inflation gas from the inflator to inflate the air bag upon sensing an electrical signal indicative of a crash.

Another purpose of this invention is to reduce the size of the air bag module so that the module will easily fit within the restricted space within a vehicle seat which defines a packaging boundary. The inflator retainer preferably uses a single piece component design, which will simplify side air bag module assembly processing. In addition, the manufacturing process of the retainer can be simplified using a deep drawn metal stamping process.

A further purpose of this invention is to provide inflation gas with a directional exit through means of a vent notch, which can be positioned relative to the desired deployment direction of the undeployed air bag cushion. The orientation of the inflator assembly exit ports is flexible to be moved relative to the desired side air bag mounting position.

Accordingly the invention comprises: A retainer assembly 22 for supporting an air bag inflator 24, the retainer assembly comprising: a hollow body 40, through which the inflator 24 is inserted, having a first end 28 and a second end 32, the second end including first means for securing a cooperating second end of the inflator 36, the first end cooperating with a corresponding first end of inflator to provide a friction fit between the two components which forms a seal and acts to reroute gas through the retainer vent notch 46. The retainer 22, along one side thereof including a set of access openings 48a and 48b and along an opposite side thereof a set of mounting holes 50a and 50b, a respective one of the access openings aligned to a corresponding mounting hole, a set of fasteners 52 mounted to the retainer 22 through corresponding mounting holes 50a and 50b, the access openings 48a and 48b providing access to a portion of the fastener to permit the fastener 52 to be secured to the retainer 22 at the corresponding mounting holes 50a and 50b.

Many other objects and purposes of the invention will be clear from the following detailed description of the drawings.

BRIEF DESCRIPTION OF THE DRAWINGS

In the drawings:

FIG. 1 is a top plan view showing the major components of the present invention.

FIG. 2 is an end plan view of the side air bag module or assembly.

FIG. 3 is a side plan view of the side air bag module.

FIG. 4 is a section view through section line 3—3 of FIG. 3, cut vertically through a mounting stud.

FIG. 5 is a cross-sectional view through section 5—5 of FIG. 1, cut horizontally through the inflator retainer.

FIG. 6 is a top plan view of the inflator retainer without the inflator.

FIG. 7 is an end view of the inflator retainer without the inflator.

FIG. 8 is a side plan view of the inflator retainer without the inflator.

FIG. 9 is a cross-sectional view of the inflator retainer without the inflator, cut vertically through section 9—9 of FIG. 8.

FIG. 10 is a cross-sectional view of the inflator retainer without the inflator, cut horizontally through section 10—10 of FIG. 6.

DETAILED DESCRIPTION OF THE DRAWINGS

Figure 12:
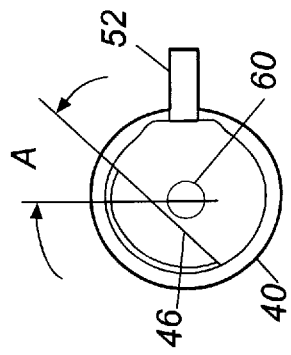
FIG. 12 is an end view of the inflator retainer of FIG. 12.

Reference is now made to the figures. FIGS. 1–5 show a side impact air bag assembly or module 20 comprising a retainer 22 with an air bag inflator 24 inserted therein. In the preferred embodiment of the invention the inflator is a hybrid inflator of known construction comprising a cylindrical body 26, having a first end 28 formed with a peripheral flared flange 30, and a second or exit end 28a having a plurality of exit ports 32 through which inflation gas is communicated to the retainer 22 and to the air bag 34 mounted (in a known manner) about the retainer 22. The inflator includes a threaded mounting fastener such as a stud 36. As is known in the art, a hybrid inflator includes a pressure vessel portion filled with an inert gas such as Argon, a quantity of propellant to heat the Argon, and a squib or initiator to cause the propellant to burn. The squib typically includes an electrical connector, generally shown by numeral 38 of known variety adapted to receive an electrical control or trigger signal indicative of a crash. Upon the opening of a burst disk internal to the inflator the inflation gas exits the inflator 24 through the exit ports 32.

As more specifically shown in FIGS. 6–10 the retainer 22 comprises a hollow body 40 with a flanged end 42 and a partial end or wall 44. The retainer 22 is preferably formed using a deep drawn process, but it may be constructed using a plurality of pieces such as a hollow sleeve and an end cap or wall portion 44. The body of the retainer is cut away to form a notch or cutout portion 46 at end 44 generally perpendicular to the mounting plane 54. The notch 46 is positioned relative to the inflator exit ports 32 in a fashion to allow the inflation gas to exit inflator ports and vent through the retainer to inflate the attached air bag 34. The notch 46 is positioned above the inflator exit ports to permit a direct flow path for the inflation gas exiting from the inflator ports positioned within the cutout and to also receive any inflation gas that may impact the walls of the retainer and be redirected outwardly through the cutout.

The retainer 22 further includes a set of access holes 48a and 48b in the body 40, and a set of mounting holes 50a and 50b. The set of holes 48a and 48b are aligned to the holes 50a and 50b. The set of holes 48a and 48b is preferably larger than holes 50*a* and 50*b,* to allow for the placement of and access to a fastener, such as a clinch stud 52 secured within the mounting holes 50*a,b*. The set of access holes 48*a* and 48*b* provides access for a tool to position the clinch nut within the mounting holes. A fastener 52 such as a clinch nut, is inserted through the first access holes 48*a* and 48*b*, and then through corresponding mounting holes 50*a* and 50*b*. The stud 52 is then clinched to the retainer body 40 using a clinch tool such as a cylindrical steel bar to apply pressure and transfer clinching load to the stud.

The inflator retainer assembly 22 is assembled by inserting the inflator assembly 24 through the retainer 22, with the inflator mounting stud 36 inserted through the retainer access hole 60 located at the end wall 44 of the retainer 22. A fastener, such as a nut 56 can be assembled over the threaded inflator mounting stud 36 after the air bag has been attached to the retainer 22. Upon insertion of the inflator into the retainer, the flanged end 28 of the inflator body 30 will create a seal with the flanged end 42 of the retainer 22, thereafter the air bag cushion 34 is secured about the retainer assembly 22. The air bag assembly or module 20 is mounted using fastener 58 to a mounting surface that is diagrammatically shown as 54. This surface 54 can be a side air bag mounting bracket, which is welded to a seat back frame, located within an automotive vehicle seat assembly.

Figure 14:
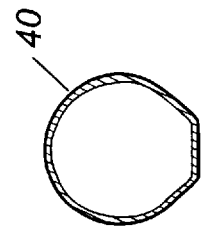
FIG. 14 is a sectional view of the inflator retainer, without the inflator, cut vertically through section 14—14 of FIG. 13.
Figure 11:
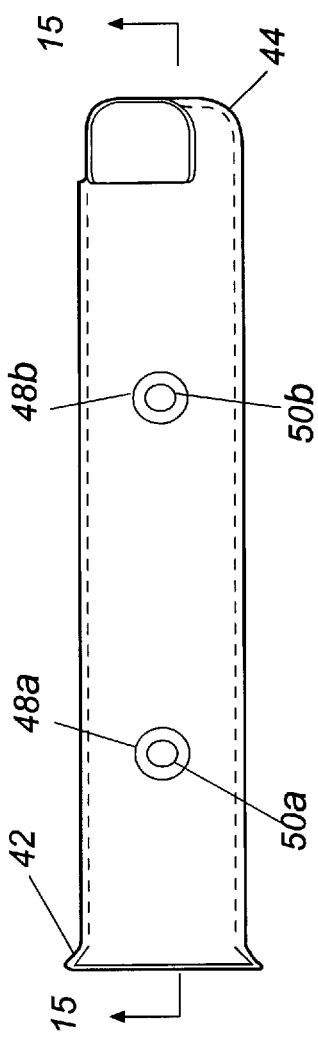
FIG. 11 is a side plan view of the inflator retainer without the inflator, showing the vent notch orientated at a skewed angle relative to the mounting studs.
Figure 13:
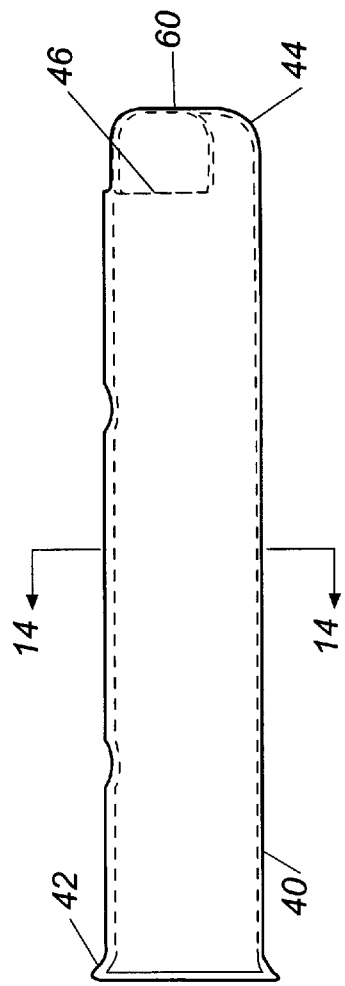
FIG. 13 is a side plan view of the inflator retainer without the inflator.
Figure 15:
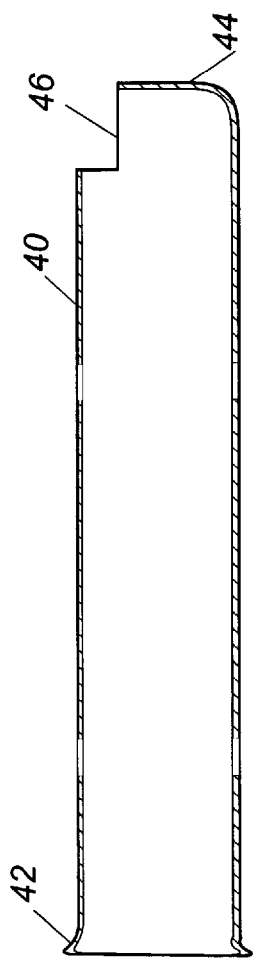
FIG. 15 is a cross-sectional view of the inflator retainer without the inflator, cut horizontally through section 15—15 of FIG. 11.

FIGS. 11–15 show an alternate embodiment of the invention. As can be appreciated, the location of the mounting studs 52 in relation to the exit notch 46 of the embodiment shown in FIGS. 1–10 will yield a configuration in which the inflation gas (see arrow 33) flows in a direction generally opposite the mounting surface or bracket 54. In certain situations the location and placement of the mounting bracket 54 will be oriented so that if the module 20 were attached thereto in the manner described above the inflation gas, and hence the direction of deployment of the air bag, would be in a direction which is not desired. In the embodiment of FIGS. 11–15 the location of the notch 46 is rotated by an angle A in relation to the plane of the mounting surface to orient the direction of inflation gas flow and air bag deployment in a desired direction. To achieve this relationship, the notch is also rotated relative to the sets of holes 48*a,b* and 50*a,b* and the position of the studs 52.

Many changes and modifications in the above described embodiment of the invention can, of course, be carried out without departing from the scope thereof. Accordingly, that scope is intended to be limited only by the scope of the appended claims.

We claim:

1. A retainer assembly (22) for supporting an air bag inflator (24), the retainer assembly comprising:

a hollow body (40), through which the inflator (24) is inserted, having a first end (28) and a second end (32), the second end including first means for securing a cooperating second end of the inflator (36), the first end cooperating with a corresponding first end of the inflator to provide a seal which acts to reroute gas through a retainer vent notch (46); the retainer (22), along one side thereof including a set of access openings (48*a*) and (48*b*) and along an opposite side thereof a set of mounting holes (50*a*) and (50*b*), a respective one of the access openings aligned to corresponding mounting holes, a set of fasteners (52) mounted to the retainer (22) through corresponding mounting holes (50*a*) and (50*b*), the access openings (48*a*) and (48*b*) providing access to a portion of the fastener to permit the fastener (52) to be secured to the retainer (22) at the corresponding mounting holes (50*a*) and (50*b*).

2. The device as defined in claim 1 wherein the opposite side of the hollow body (40), having the mounting holes, is flat.

3. The device as defined in claim 1 including an exit opening formed in the retainer as said vent notch (46), proximate the second end.

4. The device as defined in claim 3 wherein the exit opening or inflation gas notch is formed by removing a sector (46) of the retainer (22).

5. The device as defined in claim 4 wherein the exit opening (46) is aligned to an exit port (32) of the inflator.

* * * * *